(12) United States Patent
Raybold et al.

(10) Patent No.: US 12,706,425 B2
(45) Date of Patent: Aug. 11, 2026

(54) POWER CONNECTOR SYSTEM

(71) Applicant: TE Connectivity Solutions GmbH, Schaffhausen (CH)

(72) Inventors: Christopher Ryan Raybold, Middletown, PA (US); Romit Sarkar, Middletown, PA (US); Evan Dawley, Troy, MI (US)

(73) Assignee: TE Connectivity Solutions GmbH (CH)

( * ) Notice: Subject to any disclaimer, the term of this patent is extended or adjusted under 35 U.S.C. 154(b) by 262 days.

(21) Appl. No.: 18/503,039

(22) Filed: Nov. 6, 2023

(65) Prior Publication Data

US 2024/0396276 A1 Nov. 28, 2024

Related U.S. Application Data

(60) Provisional application No. 63/504,079, filed on May 24, 2023.

(51) Int. Cl.
*H01R 25/16* (2006.01)
*B60R 16/033* (2006.01)

(52) U.S. Cl.
CPC ......... *H01R 25/162* (2013.01); *B60R 16/033* (2013.01)

(58) Field of Classification Search
CPC ....... G06F 1/20; B60R 16/033; B60R 16/053; H01R 25/162
See application file for complete search history.

(56) References Cited

U.S. PATENT DOCUMENTS

| | | | | |
|---|---|---|---|---|
| 6,547,607 | B2 * | 4/2003 | Moll | H01R 13/187 439/843 |
| 7,465,177 | B2 * | 12/2008 | Wood | H01R 13/005 439/247 |
| 8,305,760 | B2 * | 11/2012 | Howes | H05K 7/20936 361/677 |
| 8,760,855 | B2 * | 6/2014 | Howes | H05K 7/20936 361/677 |
| 2022/0278578 | A1 * | 9/2022 | Ruppert | H02K 3/24 |

FOREIGN PATENT DOCUMENTS

| | | | | |
|---|---|---|---|---|
| EP | 1119077 A1 * | 7/2001 | | H01R 13/187 |
| WO | WO-2021018337 A1 * | 2/2021 | | H02K 5/20 |
| WO | WO-2023046365 A1 * | 3/2023 | | H05K 7/20927 |
| WO | 2023076181 A1 | 5/2023 | | |

* cited by examiner

*Primary Examiner* — Gary F Paumen

(57) ABSTRACT

A power connector system has first and second busbar assemblies. The first busbar assembly includes a first busbar element and a pin terminal with an inner bore and a mating interface at an exterior surface of the pin terminal. The second busbar assembly has a second busbar element and a socket terminal having a socket opening that receives the pin terminal. The pin terminal includes a cooling channel in the inner bore configured to receive cooling fluid flow therethrough. The cooling channel is located in the socket terminal when the pin terminal is received in the socket opening of the socket terminal.

27 Claims, 9 Drawing Sheets

POWER CONNECTOR SYSTEM

CROSS REFERENCE TO RELATED APPLICATIONS

This application claims the benefit of U.S. Provisional Application No. 63/504,079 filed May 24, 2023, the subject matter of which is herein incorporated by reference in its entirety.

BACKGROUND OF THE INVENTION

The subject matter herein relates generally to power connector systems.

Power connectors are used to transmit power between various components in a system. Power may be transmitted by the power connectors between a battery and a load or between a charging inlet and a battery. For example, power connectors within a vehicle, such as an electric vehicle or a hybrid electric vehicle, may be used to supply power from the battery to another component within the vehicle or may be used to recharge the battery through a charging inlet. It may be desirable to provide a separable interface between the power connectors to allow connection and disconnection, such as for service or replacement of components. The interface between the power connectors may be susceptible to damage or failure, such as from overheating during power transmission. As such, current or operating time may be limited to protect the components from overheating.

A need remains for a power connector system that may be operated in a reliable manner.

BRIEF DESCRIPTION OF THE INVENTION

In one embodiment, a power connector system is provided and includes a first busbar assembly having a first busbar element and a pin terminal extending from the first busbar element. The pin terminal has an inner bore. The pin terminal has a mating interface at an exterior surface of the pin terminal. The power connector system includes a second busbar assembly configured to be electrically coupled to the first busbar assembly to transmit power between the first busbar assembly and the second busbar assembly. The second busbar assembly has a second busbar element and a socket terminal extending from the second busbar element. The socket terminal has a socket opening that receives the pin terminal. The pin terminal includes a cooling channel in the inner bore of the pin terminal configured to receive cooling fluid flow therethrough. The cooling channel is located in the socket terminal when the pin terminal is received in the socket opening of the socket terminal.

In another embodiment, a power connector system is provided and includes a busbar element extending between a first mating portion and a second mating portion. The first mating portion is configured to be coupled to a socket terminal. The second mating portion is configured to be coupled to an electrical component. The busbar element is configured to transmit power between the socket terminal and the electrical component. The power connector system includes a pin terminal extending from the busbar element. The pin terminal extends between an inner end and an outer end. The outer end is configured to be plugged into and mated with the socket terminal. The pin terminal has a mating interface at an exterior surface of the pin terminal configured to be mated with the socket terminal. The pin terminal has an inner bore. The pin terminal including a cooling channel in the inner bore of the pin terminal is configured to receive cooling fluid flow therethrough. The cooling channel is located interior of the mating interface to cool the pin terminal at the mating interface.

In a further embodiment, a power connector system is provided and includes a busbar element extending between a first mating portion and a second mating portion. The first mating portion is configured to be coupled to a pin terminal. The second mating portion is configured to be coupled to an electrical component. The busbar element is configured to transmit power between the pin terminal and the electrical component. The power connector system includes a socket terminal extending from the busbar element. The socket terminal has a socket opening that receives the pin terminal. The power connector system includes a fluid manifold coupled to at least one of the socket terminal and the first mating portion of the busbar element. The fluid manifold has an outer shell and an inner hub extending into a cavity of the outer shell. The socket terminal is located in the cavity of the outer shell. The inner hub includes a hub interface configured to be coupled to the pin terminal. The inner hub includes a cooling channel configured to be in fluid communication with an inner bore of the pin terminal to allow cooling fluid flow therethrough between the inner hub and the inner bore.

DETAILED DESCRIPTION OF THE INVENTION

Figure 1:
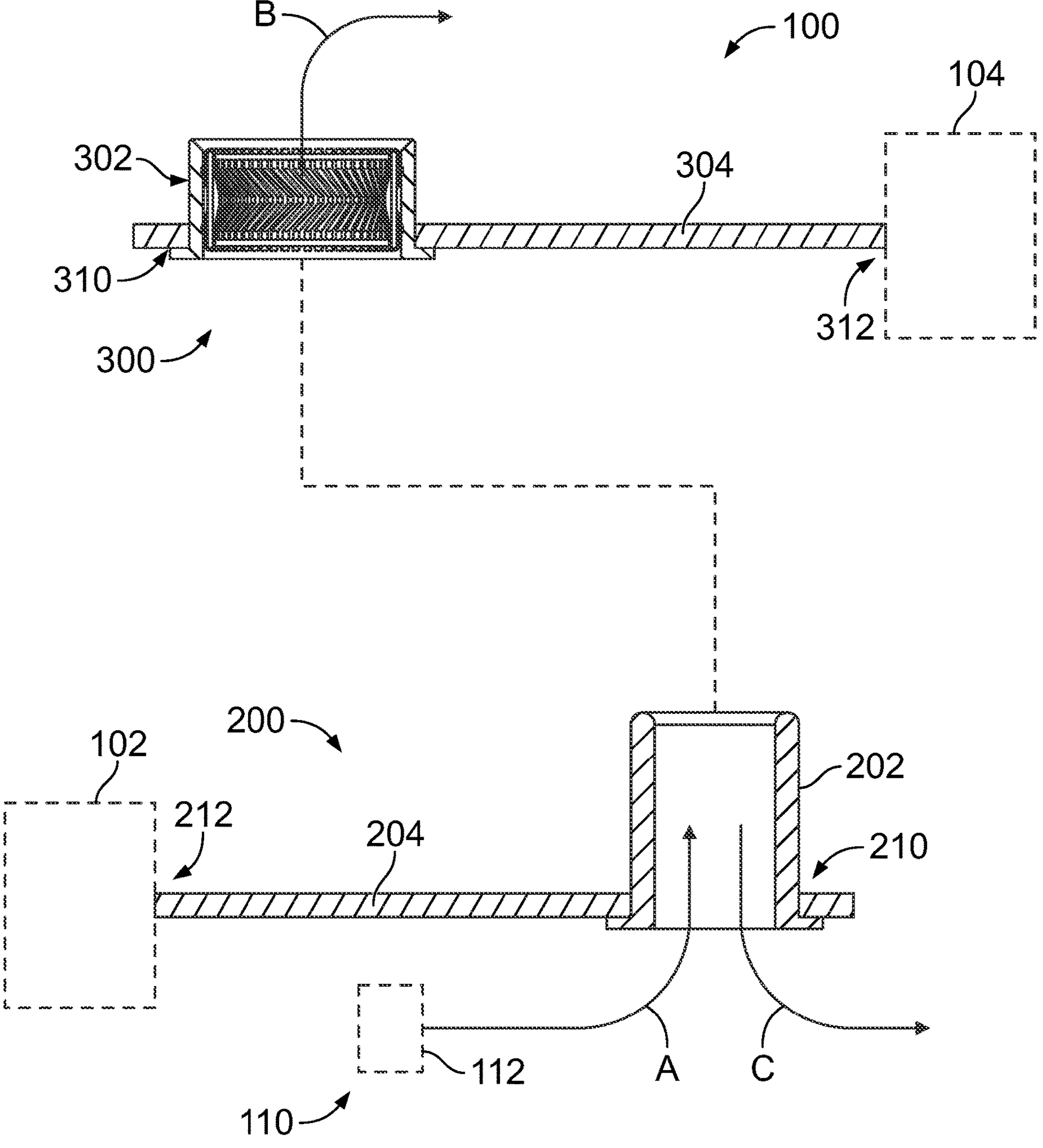
FIG. 1 illustrates a power connector system in accordance with an exemplary embodiment.

FIG. 1 illustrates a power connector system 100 in accordance with an exemplary embodiment. The power connector system 100 includes a first busbar assembly 200 and the second busbar assembly 300 configured to be coupled together to electrically connect a first electrical component 102 and a second electrical component 104. The first busbar assembly 200 is coupled to the first electrical component 102. The second busbar assembly 300 is coupled to the second electrical component 104. The first busbar assembly 200 is mated with the second busbar assembly 300 at a separable mating interface.

In various embodiments, the power connector system 100 is used in a vehicle, such as an electric vehicle or a hybrid electric vehicle. However, the power connector system 100 may be used in other systems, such as an industrial system, a communication system, a network system, a building, and the like. In an exemplary embodiment, the first electrical component 102 is a battery. The second electrical component 104 may be a load, such as a motor, that receives power from the battery. In other various embodiments, the second electrical component 104 may be a charging inlet for charging the battery.

In an exemplary embodiment, the first busbar assembly 200 includes a male mating component and the second busbar assembly 300 includes a female mating component configured to be mated at the separable mating interface. For example, the first busbar assembly 200 includes a pin terminal 202 extending from a first busbar element 204. The second busbar assembly 300 includes a socket terminal 302 extending from a second busbar element 304. The pin terminal 202 is configured to be plugged into the socket terminal 302 to electrically connect the first busbar element 204 and the second busbar element 304.

In an exemplary embodiment, the first busbar element 204 extends between a first mating portion 210 and a second mating portion 212. The first mating portion 210 includes the pin terminal 202 and is configured to be mated to the socket terminal 302 of the second busbar assembly 300. The second mating portion 212 is configured to be electrically connected to the first electrical component 102. The first busbar element 204 is configured to transmit power between the socket terminal 302 and the first electrical component 102. The first busbar element 204 is electrically connected to the first electrical component 102, such as by a direct connection (for example, crimp, weld, bolt, threaded connection, and the like) or by using other conductors, such as a cable terminated to the end of the first busbar element 204.

In an exemplary embodiment, the second busbar element 304 extends between a first mating portion 310 and a second mating portion 312. The first mating portion 310 includes the socket terminal 302 and is configured to be mated to the pin terminal 202 of the first busbar assembly 200. The second mating portion 312 is configured to be electrically connected to the second electrical component 104. The second busbar element 304 is configured to transmit power between the pin terminal 202 and the second electrical component 104. The second busbar element 304 is electrically connected to the second electrical component 104, such as by a direct connection (for example, crimp, weld, bolt, threaded connection, and the like) or by using other conductors, such as a cable terminated to the end of the second busbar element 304.

In an exemplary embodiment, the power connector system 100 includes a cooling system 110 supplying cooling fluid flow to the mating interface between the first and second busbar assemblies 200, 300. The cooling system 110 includes a cooling fluid supply line extending along path A. The cooling system 110 may be a closed loop system and include a cooling fluid return line extending along either path B or path C. For example, the cooling fluid return line may be coupled to the second busbar assembly 300 to return the cooling fluid along path B or the cooling fluid return line may be coupled to the first busbar assembly 200 to return the cooling fluid along path C. The supply and return lines may be tubes, pipes, manifolds, or other structures to contain and direct the flow of the cooling fluid through the system. In various embodiments, the cooling fluid may be liquid coolant circulated through the system. In other various embodiments, the cooling fluid may be airflow circulated through the system or passing through the power connector system 100 into the external environment. In an exemplary embodiment, the cooling system 110 includes a generator 112 for transferring the cooling fluid through the cooling system 110. The generator 112 may be a pump or other device configured to force the cooling fluid through the system.

Figure 2:
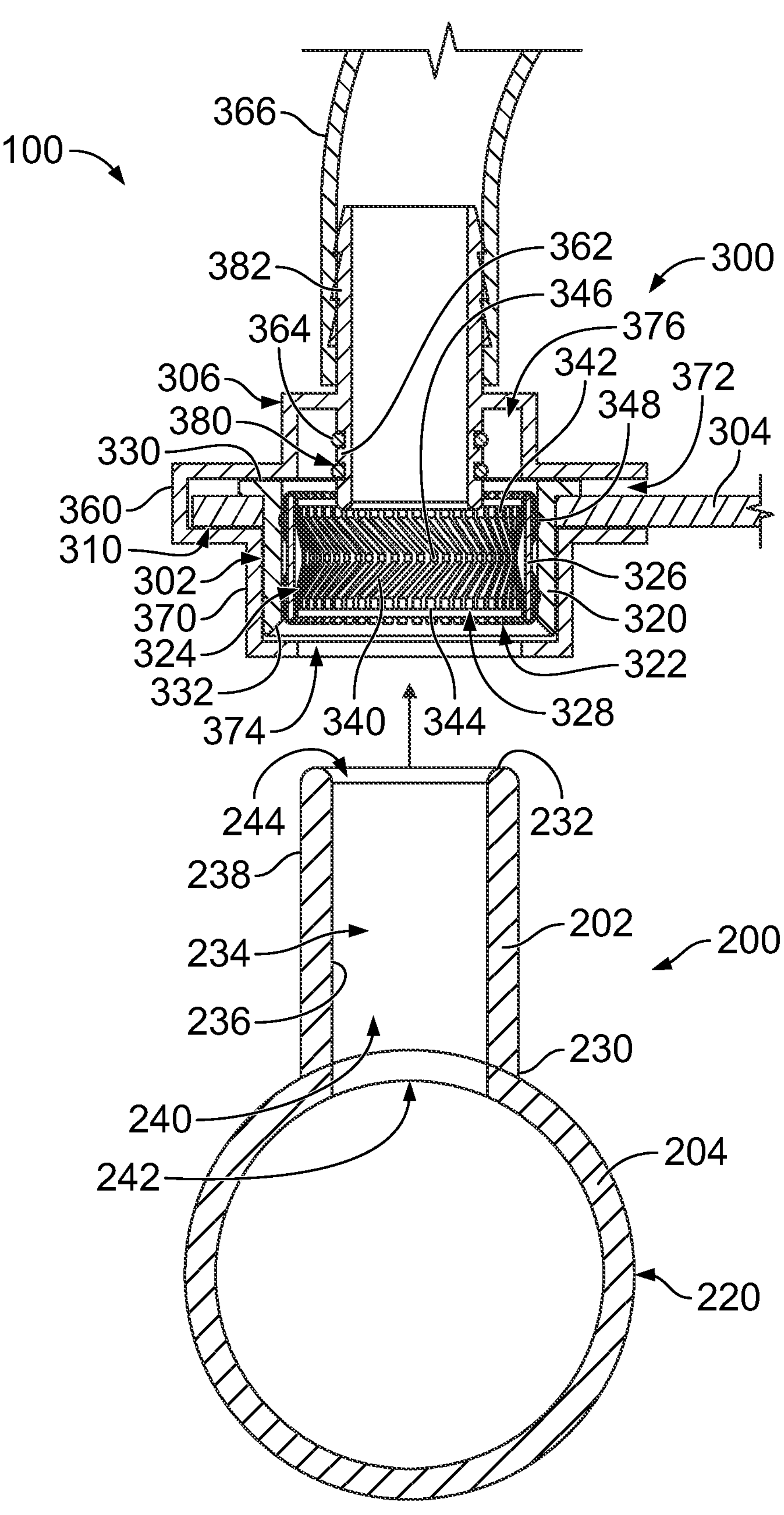
FIG. 2 is a cross-sectional view of a portion of the power connector system in an unmated state in accordance with an exemplary embodiment.
Figure 3:
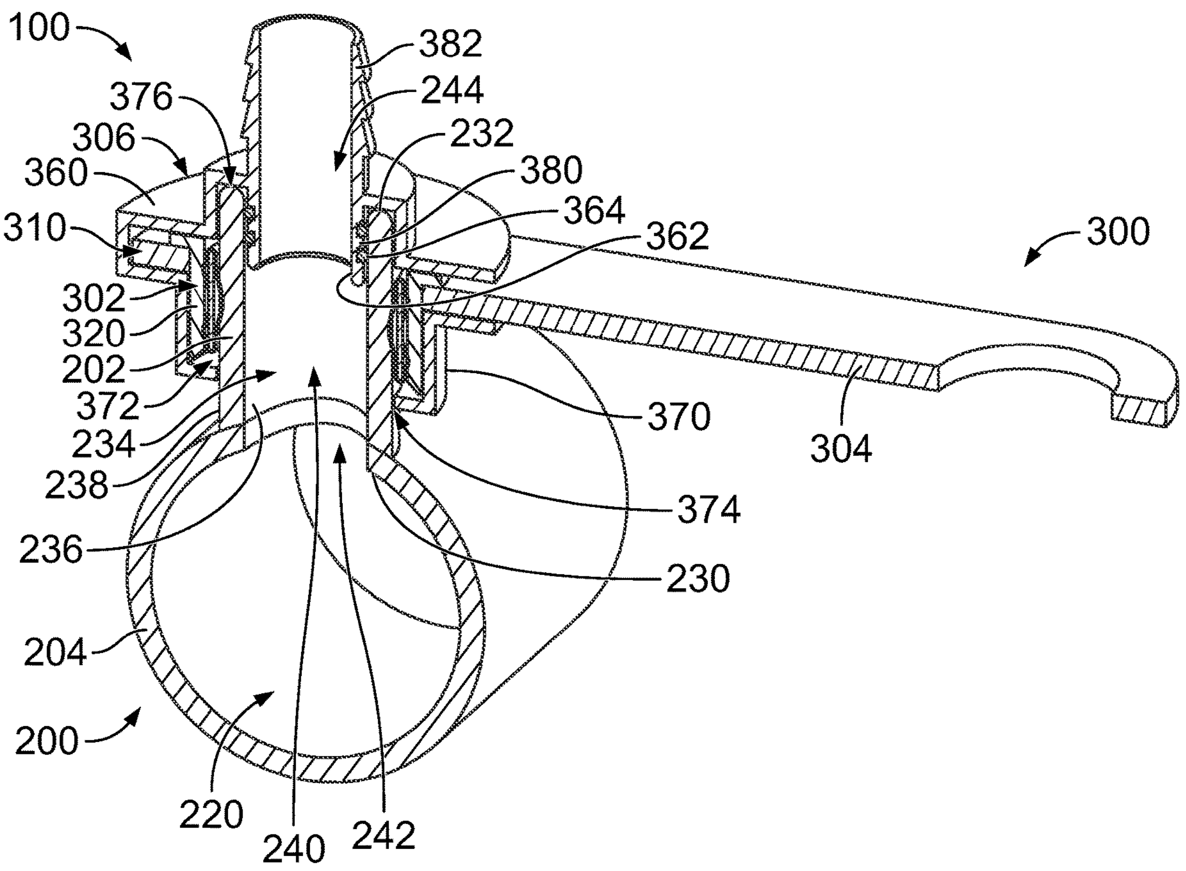
FIG. 3 is a sectional view of a portion of the power connector system in a mated state in accordance with an exemplary embodiment.
Figure 4:
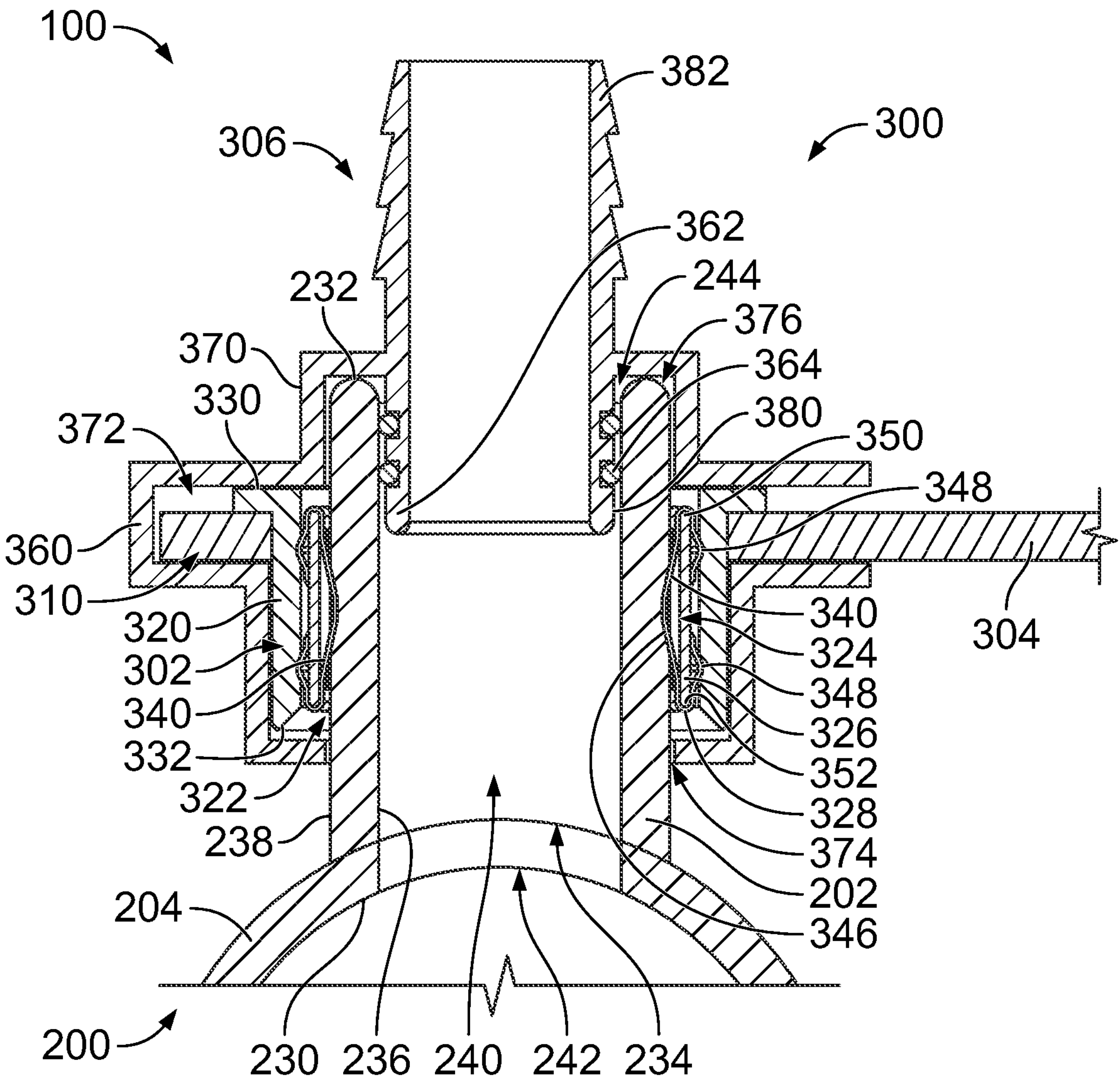
FIG. 4 is a cross-sectional view of a portion of the power connector system in a mated state in accordance with an exemplary embodiment.
Figure 5:
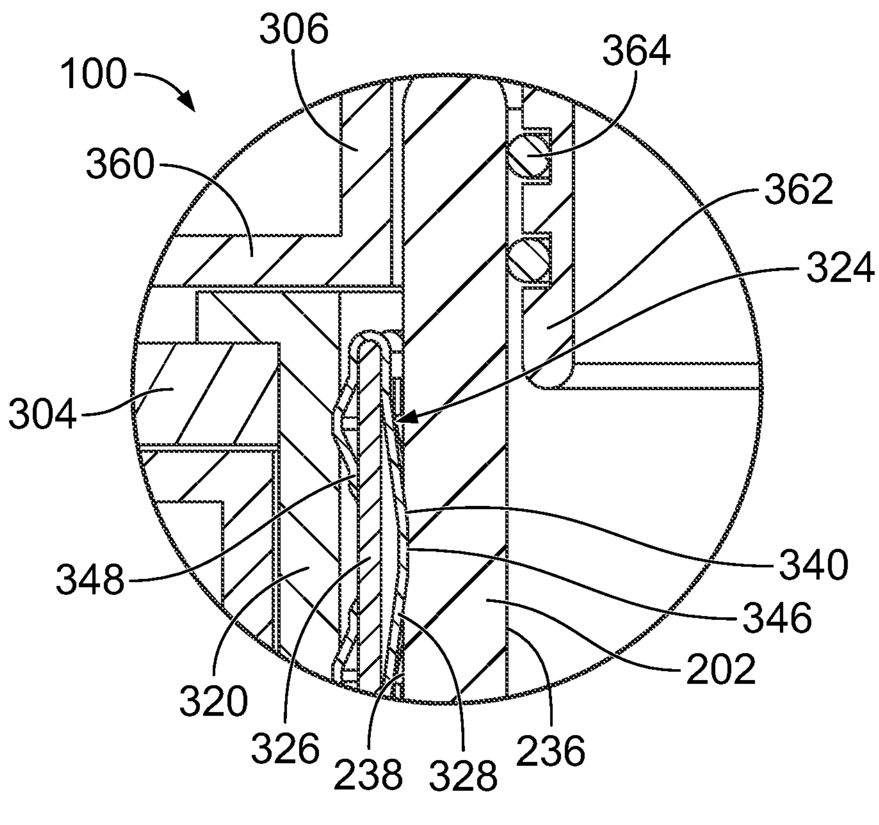
FIG. 5 is an enlarged cross-sectional view of a portion of the power connector system in a mated state in accordance with an exemplary embodiment.

FIG. 2 is a cross-sectional view of a portion of the power connector system 100 in an unmated state. FIG. 3 is a sectional view of a portion of the power connector system 100 in a mated state. FIG. 4 is a cross-sectional view of a portion of the power connector system 100 in a mated state. FIG. 5 is an enlarged cross-sectional view of a portion of the power connector system 100 in a mated state.

The pin terminal 202 is configured to be mated with the socket terminal 302 to electrically connect the first busbar element 204 and the second busbar element 304. In an exemplary embodiment, when the first busbar assembly 200 is mated with the second busbar assembly 300, a fluid coupling is made between the first busbar assembly 200 and the second busbar assembly 300 to allow fluid flow through the power connector system 100 between the first busbar assembly 200 and the second busbar assembly 300. The fluid flow is used to cool the pin terminal 202 and the socket terminal 302 at the mating interface. The cooling system 110 lower the operating temperature of the pin terminal 202 and the socket terminal 302 to allow higher electrical current transferred between the first and second busbar assemblies 200, 300 and/or to reduce the risk of damage to the pin terminal 202 and/or the socket terminal 302.

The first busbar element 204 is manufactured from a conductive material, such as a metal material. In various embodiments, the first busbar element 204 is manufactured from copper or a copper alloy. In the illustrated embodiment, the first busbar element 204 is tube-shaped. For example, the first busbar element 204 may be cylindrical. The first busbar element 204 forms a fluid supply tube 220 for the cooling fluid. The cooling fluid is transported through the fluid supply tube 220. The fluid supply tube 220 supplies cooling fluid to the pin terminal 202. The first busbar element 204 may have other shapes in alternative embodiments. For example, the first busbar element 204 may form a square or rectangular fluid supply tube. In other various embodiments, the first busbar element 204 may be generally planar, such as being a metal plate. In such embodiments, the fluid supply tube may be separate and discrete from the first busbar element 204, but may be coupled to the first busbar element 204 and/or the pin terminal 202.

The pin terminal 202 extends from the first busbar element 204. In various embodiments, the pin terminal 202 is integral with the first busbar element 204, such as being extruded with the first busbar element 204. However, in alternative embodiments, the pin terminal 202 may be separate and discrete from the first busbar element 204 and coupled to the first busbar element 204. For example, the pin terminal 202 may be separately manufactured and loaded into an opening in the first busbar element 204. In such embodiments, the pin terminal 202 may be press-fit into the opening and/or welded to the first busbar element 204. When separately manufactured, the pin terminal 202 may be manufactured from a different material than the first busbar element 204.

The pin terminal 202 extends between an inner end 230 and an outer end 232. The inner end 230 is provided at the first busbar element 204. The outer end 232 is located remote from the first busbar element 204. The outer end 232 defines a mating end of the pin terminal 202. The outer end 232 is configured to be plugged into the socket terminal 302. The pin terminal 202 includes an inner bore 234 extending at least partially through the pin terminal 202. In the illustrated embodiment, the inner bore 234 extends entirely through the pin terminal 202 and is open at the inner end 230 and the outer end 232. The inner bore 234 allows cooling fluid to flow into the pin terminal 202. The pin terminal 202 includes an interior surface 236 and an exterior surface 238. The interior surface 236 defines the inner bore 234. The exterior surface 238 defines a separable mating interface of the pin terminal 202. The exterior surface 238 is configured to be electrically connected to the socket terminal 302.

In an exemplary embodiment, the pin terminal 202 includes at least one cooling channel 240 within the inner bore 234. The cooling channel 240 receives cooling fluid from the fluid supply tube 220. In the illustrated embodiment, the cooling channel 240 is open at the inner end 230 and the outer end 232 to allow the cooling fluid to flow through the pin terminal 202. However, the cooling channel 240 may be closed at the inner end 230 and/or the outer end 232 to allow the cooling fluid to flow into and out of the same end 234 232. The cooling channel 240 includes an inlet port 242 and an outlet port 244. The cooling fluid flows through the cooling channel 240 from the inlet port 242 to the outlet port 244. In the illustrated embodiment, the inlet port 242 is located at the inner end 230 and the outlet port 244 is located at the outer end 232. The inlet port 242 is in fluid communication with the fluid supply tube 220. For example, the inlet port 242 is located at an opening between the first busbar element 204 and the pin terminal 202 to allow fluid flow from the fluid supply tube 220 into the cooling channel 240. The fluid is allowed to exit the first busbar assembly 200 into the second busbar assembly 300 through the outlet port 244. However, in alternative embodiments, the flow may be reversed, such as flowing from the second busbar assembly 300 into the first busbar assembly 200. In such embodiments, the inlet port 242 is provided at the outer end 232 and the outlet port 244 is provided at the inner end 230. In other alternative embodiments, the inner bore 234 may be closed at the outer end 232. Both the inlet port 242 and the outlet port 244 may be provided at the inner end 230. In other various embodiments, rather than having the inlet port 242 at the outlet port 244 at the ends 230, 232, the inlet port 242 and/or the outlet port 244 may be provided in the side of the pin terminal 202.

The second busbar assembly 300 includes the second busbar element 304, the socket terminal 302 and a fluid manifold 306 coupled to at least one of the socket terminal 302 and the second busbar element 304. The fluid manifold 306 allows fluid flow through the second busbar assembly 300. The fluid manifold 306 is configured to be fluidly coupled to the first busbar assembly 200, such as to the cooling channel 240 of the pin terminal 202.

The second busbar element 304 is manufactured from a conductive material, such as a metal material. In various embodiments, the second busbar element 304 is manufactured from copper or a copper alloy. In the illustrated embodiment, the second busbar element 304 is a metal plate. The second busbar element 304 may be planar. In various embodiments, the second busbar element 304 is stamped from a metal sheet. The second busbar element 304 may have other shapes in alternative embodiments.

The socket terminal 302 includes a terminal body 320 having a socket opening 322 therethrough. The socket terminal 302 includes a contact spring module 324 received in the socket opening 322 and electrically connected to the terminal body 320. The contact spring module 324 is configured to be electrically connected to the pin terminal 202 when the pin terminal 202 is plugged into the socket opening 322. The contact spring module 324 forms a separable mating interface with the pin terminal 202. In an exemplary embodiment, the contact spring module 324 includes a support tube 326 and a spring ring 328 wrapped around the support tube 326. The spring ring 328 is compressible during mating with the pin terminal 202. The spring ring 328 forms a reliable electrical connection with the pin terminal 202. The spring ring 328 includes multiple points of contact with the pin terminal 202 and multiple points of contact with the terminal body 320 to create a conductive path between the pin terminal 202 and the socket terminal 302.

The socket terminal 302 extends from the second busbar element 304. In various embodiments, the terminal body 320 of the socket terminal 302 is integral with the second busbar element 304, such as being extruded with the second busbar element 304. However, in alternative embodiments, the terminal body 320 of the socket terminal 302 may be separate and discrete from the second busbar element 304 and coupled to the second busbar element 304. For example, the terminal body 320 of the socket terminal 302 may be separately manufactured and loaded into an opening in the second busbar element 304. In such embodiments, the terminal body 320 of the socket terminal 302 may be press-fit into the opening and/or welded to the second busbar element 304. When separately manufactured, the terminal body 320 of the socket terminal 302 may be manufactured from a different material than the second busbar element 304.

The socket terminal 302 extends between an inner end 330 and an outer end 332. The inner end 330 is provided at the second busbar element 304. The outer end 332 is located remote from the second busbar element 304. The second busbar assembly 300 may be oriented such that the inner end 330 is located at a top of the socket terminal 302 and the outer end 332 is located at a bottom of the socket terminal 302. Other orientations are possible in alternative embodiments. The socket terminal 302 is configured to receive the pin terminal 202 through the outer end 332. The socket opening 322 extends entirely through the socket terminal 302 and is open at the inner end 330 and the outer end 332.

In an exemplary embodiment, the spring ring 328 is stamped and formed in wrapped into a ring-shaped. The spring ring 328 includes a plurality of spring elements 340. In an exemplary embodiment, the spring elements 340 are connected together by connecting elements forming a first band 342 at the top of the spring ring 328 and a second band 344 at the bottom of the spring ring 328. The spring elements 340 are arch shaped or V-shaped between the bands 342, 344. The spring elements 340 are flexed inward between the bands 342, 344 such that the spring ring 328 has an hourglass shape being narrower in the middle and wider at the bands 342, 344. The spring elements 340 have mating interfaces 346 in the middle between the bands 342, 344 to interface with the pin terminal 202. In an exemplary embodiment, when the spring ring 328 is formed in the ring-shaped, the spring elements 340 form torsional springs configured to interface with the pin terminal 202. The spring elements 340 may be flexed outward when the pin terminal 202 is plugged into the socket opening 322 to create a reliable mechanical and electrical connection between the spring ring 328 and the pin terminal 202.

In an exemplary embodiment, upper and lower ends of the spring elements 340 are wrapped around the support tube 326 to form outer spring elements 348. For example, the outer spring elements 348 are wrapped around a first end 350 and a second end 352 of the support tube 326. The outer spring elements 348 are shaped to interface with the terminal body 320 when the spring ring 328 is received in the socket opening 322. The outer spring elements 348 are deflectable to create a reliable electrical connection between the spring ring 328 and the terminal body 320.

Other types of socket terminals may be used in alternative embodiments to create an electrical connection between the pin terminal 202 and the second busbar element 304.

The fluid manifold 306 is coupled to the first mating portion 310 of the second busbar element 304. The fluid manifold 306 surrounds the socket terminal 302. The fluid manifold 306 is configured to be coupled in flow communication with the cooling channel 240 of the pin terminal 202 2 allow fluid flow through the second busbar assembly 300. In an exemplary embodiment, the fluid manifold 306 includes an outer shell 360, an inner hub 362, and interface seal 364, and a fluid line 366 (FIG. 2).

The outer shell 360 has one or more walls 370 forming a cavity 372. The first mating portion 310 of the second busbar element 304 extends into the cavity 372. The socket terminal 302 is located within the cavity 372. Optionally, the outer shell 360 may completely surround the socket terminal 302. The outer shell 360 includes a shell opening 374 aligned with the socket opening 322. The shell opening 374 receives the pin terminal 202 and allows the pin terminal 202 2 plugged into the socket terminal 302. In the illustrated embodiment, the shell opening 374 is provided at the bottom of the outer shell 360. Other locations and orientations are possible in alternative embodiments. In an exemplary embodiment, the outer shell 360 includes a pocket 376 opposite the shell opening 374. For example, the pocket 376 may be located at a top of the outer shell 360. The pocket 376 is configured to receive the distal end of the pin terminal 202 when the pin terminal 202 is plugged into the second busbar assembly 300. The pocket 376 may be located above the socket terminal 302 to receive a portion of the pin terminal 202 that passes completely through the socket terminal 302.

The inner hub 362 extends into the cavity 372 to interface with the pin terminal 202 when the pin terminal 202 is plugged into the second busbar assembly 300. For example, the inner hub 362 may extend into the pocket 376 2 interface with the mating end of the pin terminal 202. In an exemplary embodiment, the inner hub 362 is cylindrical. However, the inner hub 362 may have other shapes in alternative embodiments. The inner hub 362 includes a hub interface 380 configured to be coupled to the pin terminal 202. In an exemplary embodiment, the interface seal 364 is coupled to the hub interface 380. For example, the interface seal 364 extends around the outer surface of the hub interface 380. The interface seal 364 is configured to seal to the interior surface 236 of the pin terminal 202 to create a fluid tight seal between the pin terminal 202 and the inner hub 362. In an exemplary embodiment, a portion of the inner hub 362 extends to the exterior of the outer shell 360. For example, the inner hub 362 includes a connection tube 382. The fluid line 366 is coupled to the connection tube 382. Optionally, the connection tube 382 may include barbs or other features to mechanically secure the fluid line 366 to the connection tube 382. Optionally, the fluid line 366 may be a plastic tube configured to be plugged onto the connection tube 382. The fluid line 366 receives the cooling fluid from the pin terminal 202 via the inner hub 362.

When the first and second busbar assemblies 200, 300 are mated, the fluid coupling is made to allow fluid flow through the power connector system 100 between the first busbar assembly 200 and the second busbar assembly 300. The fluid flow is used to cool the pin terminal 202 and the socket terminal 302 at the mating interface. For example, the cooling flow is located immediately behind the mating interface to provide cooling close to the source of heating. The cooling system 110 lower the operating temperature of the pin terminal 202 and the socket terminal 302 to allow higher electrical current transferred between the first and second busbar assemblies 200, 300 and/or to reduce the risk of damage to the pin terminal 202 and/or the socket terminal 302. For example, by cooling the body of the pin terminal directly at the mating interface, the operating temperature of the spring elements 340 may be lowered, reducing the risk of failure of the spring elements from overheating. The cooling of the pin terminal and the socket terminal, such as at the spring elements 340, allows operation at higher currents and/or for longer operating times. For example, fast charging of the battery through the power connector system 100 may occur at higher currents or for longer duration due to the lower operating temperatures provided by the cooling system.

Figure 6:
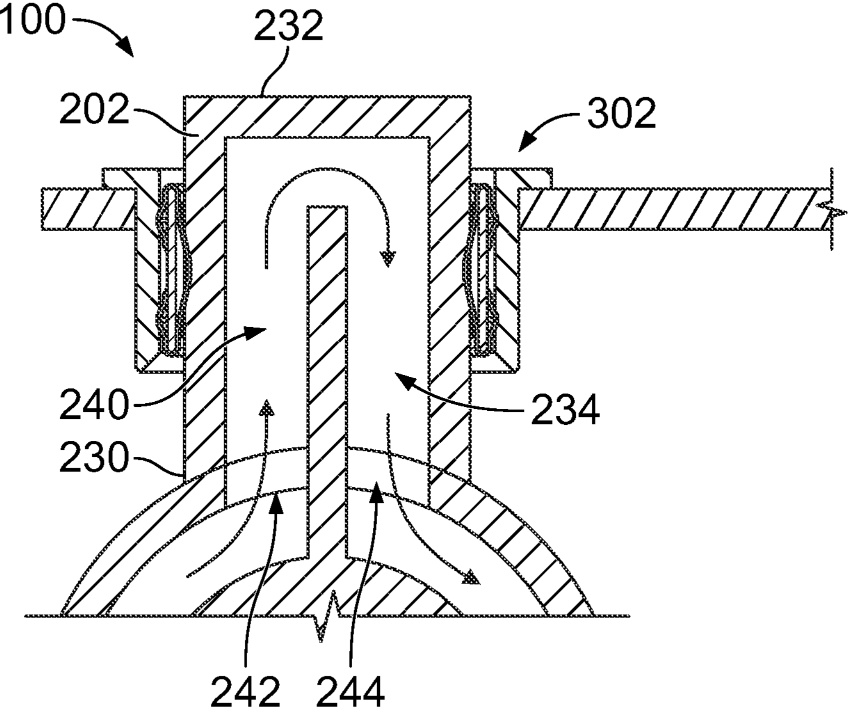
FIG. 6 is a cross-sectional view of a portion of the power connector system in a mated state in accordance with an exemplary embodiment.

FIG. 6 is a cross-sectional view of a portion of the power connector system 100 in a mated state. FIG. 6 illustrates an embodiment wherein the supply and the return for the cooling fluid both occur through the inner end 230 of the pin terminal 202. The inner bore 234 of the pin terminal 202 is closed. For example, the outer end 232 is closed. The inlet port 242 for the cooling channel 240 is at the inner end 230 and the outlet port 244 for the cooling channel 240 is also at the inner end 230. The cooling channel 240 in the pin terminal extends to locations near the mating interface to cool the mating interface of the pin terminal 202, and thus provide cooling for the socket terminal 302 to lower the operating temperatures of both the pin terminal 202 and the socket terminal 302.

Figures 7, 8:
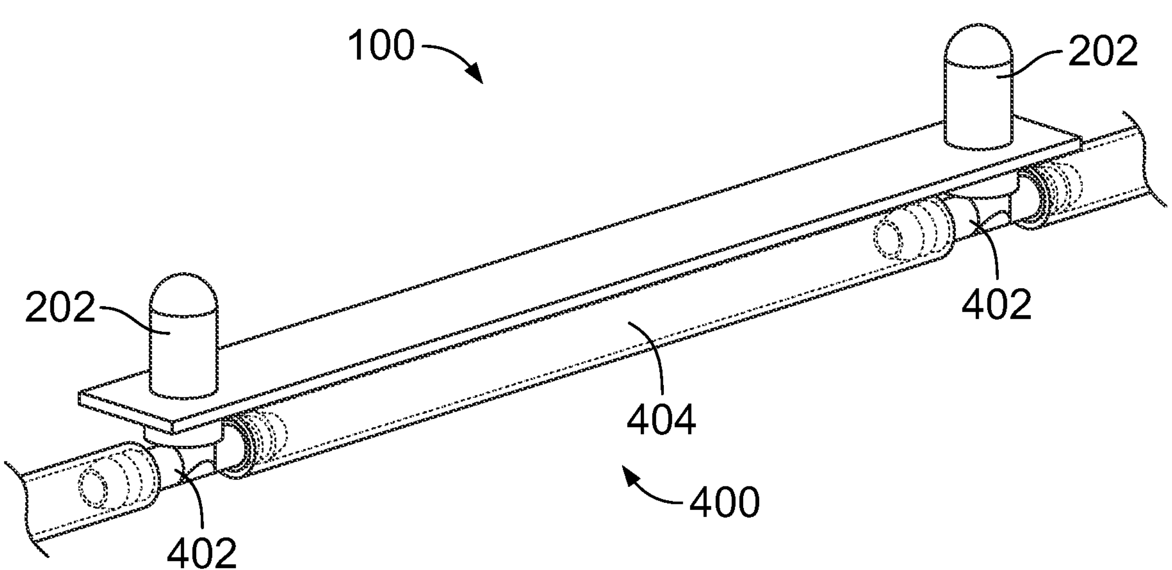
FIG. 7 illustrates a portion of the power connector system in accordance with an exemplary embodiment using closed pins for cooling.
FIG. 8 is a cross sectional view of a portion of the power connector system in accordance with an exemplary embodiment showing the closed pin terminal connected to the busbar element.

FIG. 7 illustrates a portion of the power connector system 100 in accordance with an exemplary embodiment using closed pins for cooling. The closed pin terminals 202 are shown at both ends of the busbar element 204. A fluid manifold 400 supplies cooling fluid to the pin terminals 202. The fluid manifold 400 includes cooling inserts 402 attached to the pin terminals 202. Cooling channels 404 are connected to the cooling inserts 402 to allow cooling flow to/from the cooling inserts 402. The cooling channels 404 may be pipes or tubes. The cooling fluid flows into the pin terminals 202 to lower the operating temperatures of the pin terminals 202, and thus any socket terminals connected to the pin terminals 202.

Figure 9:
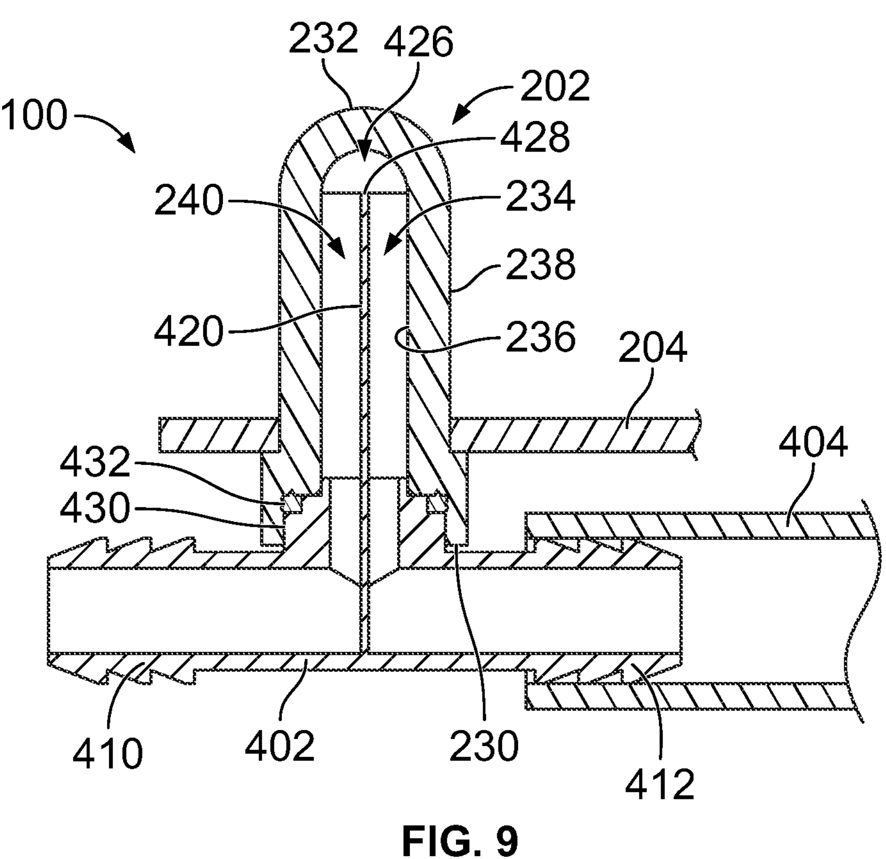
FIG. 9 is a cross sectional view of the pin terminal in accordance with an exemplary embodiment.
Figure 10:
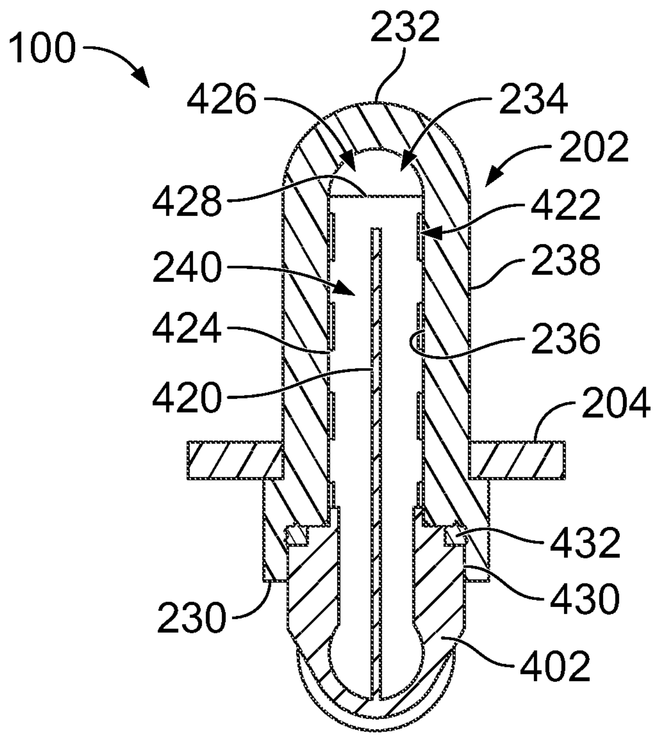
FIG. 10 is a cross sectional view of the pin terminal in accordance with an exemplary embodiment.

FIG. 8 is a cross sectional view of a portion of the power connector system 100 in accordance with an exemplary embodiment showing the closed pin terminal 202 connected to the busbar element 204. FIG. 9 is a cross sectional view of the pin terminal 202 in accordance with an exemplary embodiment. FIG. 10 is a cross sectional view of the pin terminal 202 in accordance with an exemplary embodiment.

The first busbar element 204 is manufactured from a conductive material, such as a metal material. In various embodiments, the first busbar element 204 is manufactured from copper or a copper alloy. In the illustrated embodiment, the first busbar element 204 is flat, such as being a metal plate. The supply tube for the cooling fluid is supplied by the cooling tube 404, which is separate from the first busbar element 204 in the illustrated embodiment. The cooling tube 404 may be coupled to the first busbar element 204 in various embodiments. The cooling fluid is transported through the cooling tube 404 to the cooling insert 402, which supplies cooling fluid to the pin terminal 202.

The pin terminal 202 extends from the first busbar element 204. In various embodiments, the pin terminal 202 is separate and discrete from the first busbar element 204 and coupled to the first busbar element 204. For example, the pin terminal 202 may be separately manufactured and loaded into an opening in the first busbar element 204. In such embodiments, the pin terminal 202 may be press-fit into the opening and/or welded to the first busbar element 204. The pin terminal 202 may be manufactured from a different material than the first busbar element 204.

The pin terminal 202 extends between the inner end 230 and the outer end 232. The inner end 230 is provided at the first busbar element 204. The outer end 232 is located remote from the first busbar element 204 and is configured to be plugged into a socket terminal. The outer end 232 defines a mating end of the pin terminal 202. The pin terminal 202 includes an inner bore 234 extending at least partially through the pin terminal 202. In the illustrated embodiment, the inner bore 234 is open at the inner end 230 and closed at the outer end 232. The cooling insert 402 is received in the inner bore 234 to control fluid flow through the pin terminal 202, such as through the cooling channel 240 directly along the interior surface 236 to cool the pin terminal 202. The exterior surface 238 defines a separable mating interface of the pin terminal 202. The exterior surface 238 is configured to be electrically connected to the socket terminal.

The cooling insert 402 includes a first port 410 and a second port 412. The cooling tubes 404 are connected to the ports 410, 412, such as to supply or return the cooling fluid to a remote location. The cooling insert 402 includes a wall 420 between the ports 410, 412. The wall 420 is received in the inner bore 234 to form the cooling channels 240. For example, the wall 420 may be approximately centered in the pin terminal 202 to form an inlet cooling channel and an outlet cooling channel for fluid flow through the pin terminal 202. The wall 420 may engage the interior surface 236 to position the cooling insert 402 in the inner bore 234. In an exemplary embodiment, the wall 420 includes slots 422 (FIG. 10) at outer edges 424 of the wall 420. The slots 422 allow cooling fluid flow between the cooling channels 240, which encourages cooling fluid flow along the interior surface 236 of the pin terminal 202 to promote cooling of the pin terminal 202. A gap 426 is provided above a distal end 428 of the wall and the outer end 232 of the pin terminal 202. The gap 426 is sized to encourage cooling flow along the length of the pin terminal 202. For example, the gap 426 is sufficiently large such that a significant portion of the fluid flows through the gap 426 rather than through the slots 422, which encourages cooling flow along the entire pin terminal 202. The cooling insert 402 includes a connecting hub 430 plugged into the inner end 230 of the pin terminal 202. A seal 432 is provided at the connecting hub 430 to seal the connection between the connecting hub 430 and the pin terminal 202. The cooling hub 430 may be secured to the pin terminal 202 using adhesive or other securing means, such as latches, clips, fasteners, and the like.

Figure 11:
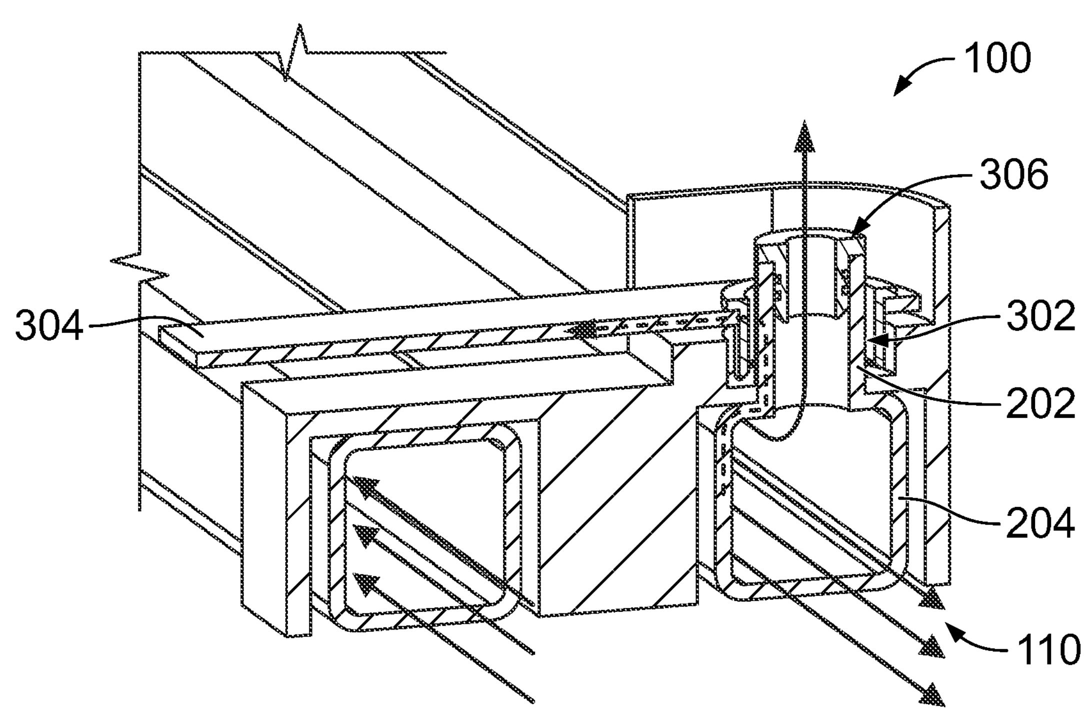
FIG. 11 is a sectional view of a portion of the power connector system in a mated state.

FIG. 11 is a sectional view of a portion of the power connector system 100 in a mated state. FIG. 11 shows the cooling system 110 in accordance with an exemplary embodiment. In the illustrated embodiment, the first busbar element 204, which incorporates the pin terminal 202, is used to define both the fluid flow path and the electrical path for the power connector system 100. The first busbar element 204 distributes both the fluid and the electrical supply for the pin terminal 202. The power is supplied to the second busbar element 304 through the socket terminal 302. The fluid is supplied to the fluid manifold 306.

Figure 12:
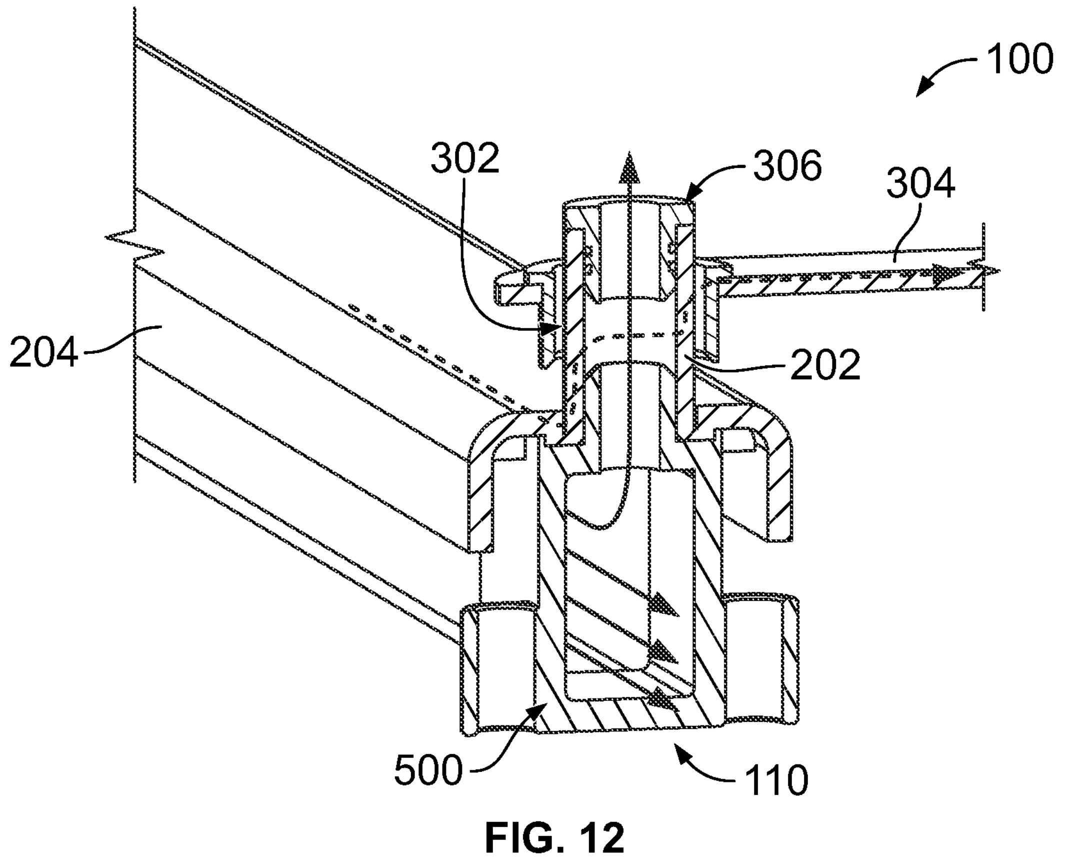
FIG. 12 is a sectional view of a portion of the power connector system in a mated state.

FIG. 12 is a sectional view of a portion of the power connector system 100 in a mated state. FIG. 12 shows the cooling system 110 in accordance with an exemplary embodiment. In the illustrated embodiment, the first busbar element 204, which incorporates the pin terminal 202, defines the electrical path for the power connector system 100. However, the fluid flow path is defined by a separate fluid manifold 500, which is connected to the fluid manifold 306 through the pin terminal 202. The first busbar element 204 only distributes the electrical supply, but not the fluid supply, for the pin terminal 202. The power is supplied to the second busbar element 304 through the socket terminal 302. The fluid is supplied to the fluid manifold 306 through the pin terminal 202, which is used to cool the pin terminal 202 and the socket terminal 302.

Figure 13:
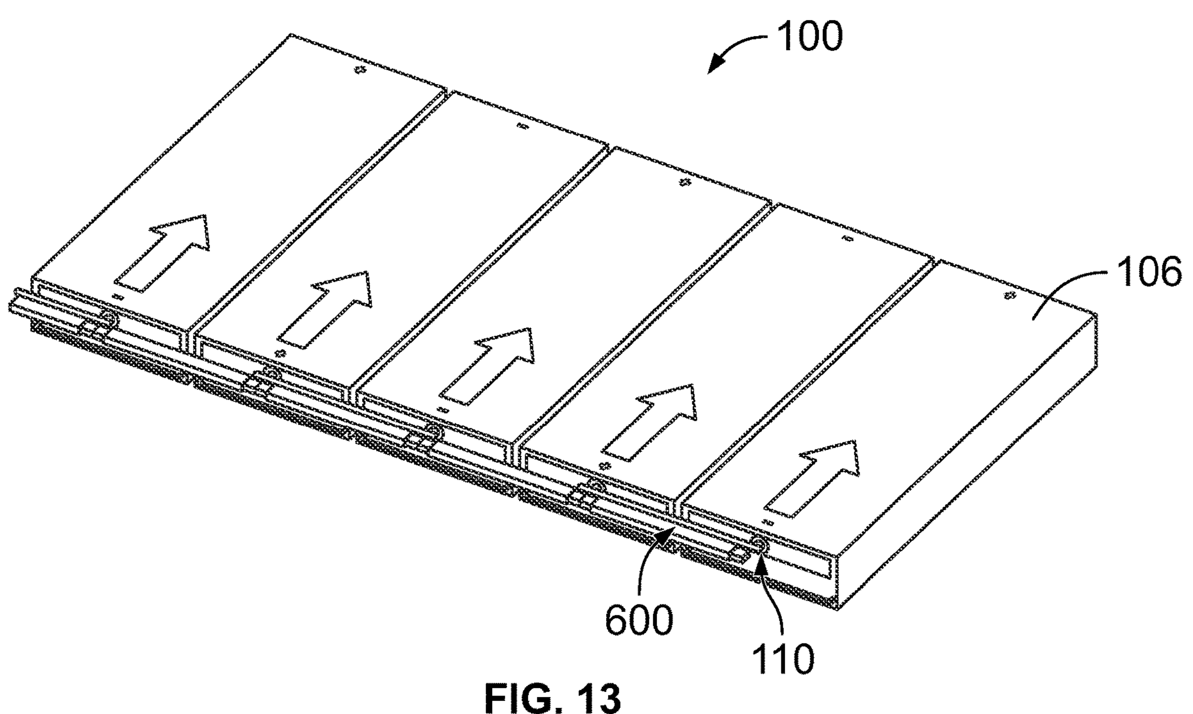
FIG. 13 illustrates the power connector system showing the cooling system in accordance with an exemplary embodiment.

FIG. 13 illustrates the power connector system 100 showing the cooling system 110 in accordance with an exemplary embodiment. A series of components 106, such as batteries, are shown. The components 106 are electrically connected in series using busbar elements connected using pin terminals 202 and socket terminals 302. The cooling system 110 provides cooling in parallel using a cooling manifold 600. For example, the cooling manifold 600 is connected to each of the components 106, in parallel.

Figure 14:
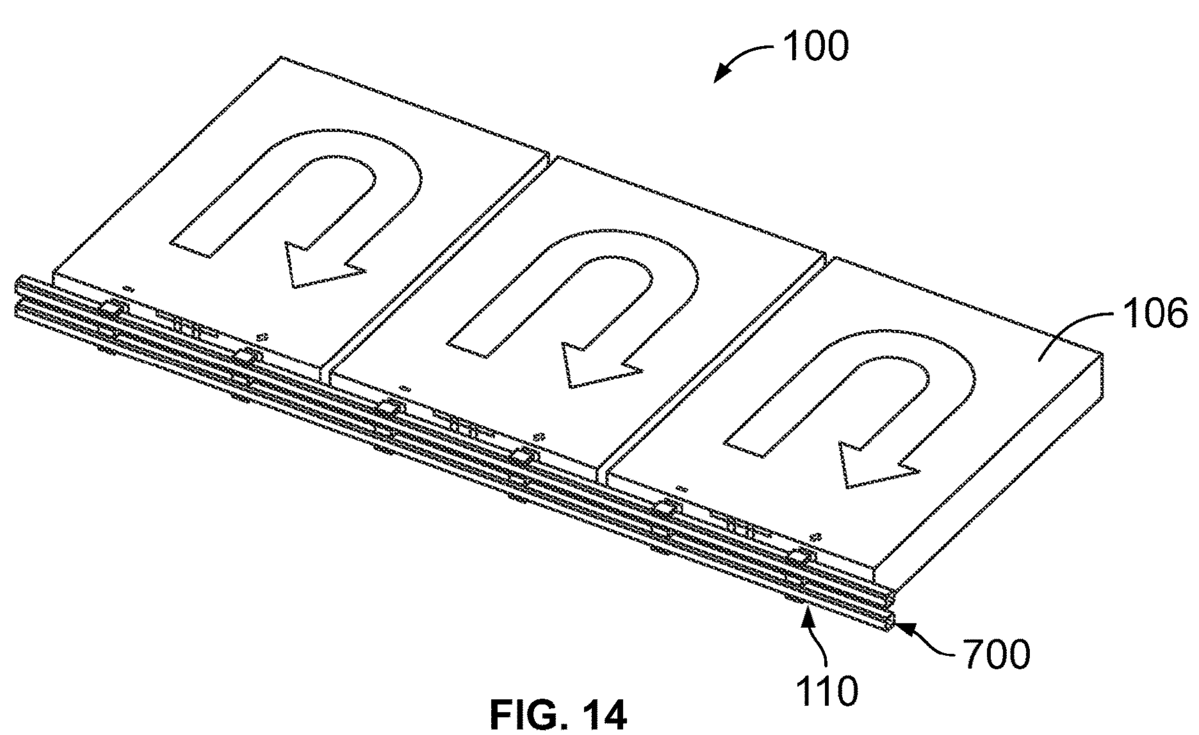
FIG. 14 illustrates the power connector system showing the cooling system in accordance with an exemplary embodiment.

FIG. 14 illustrates the power connector system 100 showing the cooling system 110 in accordance with an exemplary embodiment. A series of components 106, such as batteries, are shown. The components 106 are electrically connected in parallel using busbar elements connected using pin terminals 202 and socket terminals 302. The cooling system 110 provides cooling in parallel using a cooling manifold 700. For example, the cooling manifold 700 is connected to each of the components 106, in parallel.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A power connector system comprising:

a first busbar assembly having a first busbar element and a pin terminal extending from the first busbar element, the pin terminal having an inner bore, the pin terminal having a mating interface at an exterior surface of the pin terminal;

a second busbar assembly configured to be electrically coupled to the first busbar assembly to transmit power between the first busbar assembly and the second busbar assembly, the second busbar assembly having a second busbar element and a socket terminal extending from the second busbar element, the socket terminal having a socket opening receiving the pin terminal;

wherein the pin terminal includes a cooling channel in the inner bore of the pin terminal configured to receive cooling fluid flow therethrough, the cooling channel located in the socket terminal when the pin terminal is received in the socket opening of the socket terminal; and wherein the first busbar element is tube-shaped forming a fluid supply tube supplying fluid to the cooling channel.

2. The power connector system of claim 1, wherein the pin terminal extends between an inner end and an outer end, the cooling channel passing through the pin terminal from the inner end to the outer end.

3. The power connector system of claim 1, wherein the pin terminal extends between an inner end and an outer end, the cooling channel having an inlet port at one of the inner end or the outer end and an outlet port at the other of the inner end or the outer end.

4. The power connector system of claim 1, wherein the pin terminal extends between an inner end and an outer end, the inner bore being closed at the outer end, the cooling channel including an inlet port at the inner end and an outlet port at the inner end.

5. The power connector system of claim 1, wherein the first busbar element includes a fluid supply tube in flow communication with the cooling channel.

6. The power connector system of claim 1, wherein the second busbar assembly includes a fluid manifold coupled to at least one of the socket terminal and the second busbar element, the fluid manifold having an outer shell and an inner hub extending into a cavity of the outer shell, the socket terminal being located in the cavity of the outer shell, the inner hub including a hub interface configured to be coupled to the pin terminal, the inner hub including a cooling channel configured to be in fluid communication with the cooling channel of the pin terminal to allow cooling fluid flow therethrough between the inner hub and the inner bore.

7. The power connector system of claim 6, wherein the inner hub extends into the socket opening.

8. The power connector system of claim 6, further comprising an interface seal at the hub interface configured to seal to the pin terminal.

9. The power connector system of claim 6, wherein the outer shell includes a pocket configured to receive a mating end of the pin terminal, the inner hub extending into the pocket to interface with the mating end of the pin terminal.

10. The power connector system of claim 6, wherein the outer shell includes a shell opening aligned with the socket opening, the shell opening is configured to receive the pin terminal.

11. The power connector system of claim 6, wherein the inner hub extends between a first end and a second end, the first end located in the cavity and defining the hub interface, the second end located exterior of the cavity for connecting to a fluid line.

12. The power connector system of claim 1, wherein the socket terminal includes a contact spring module in the socket opening, the contact spring module includes a plurality of spring elements each having a mating interface configured to be mated to the mating interface of the pin terminal to electrically connect the socket terminal to the pin terminal at multiple points of contact.

13. The power connector system of claim 12, wherein the contact spring module includes a first band and a second band, the spring elements extending between the first band and the second band.

14. The power connector system of claim 12, wherein the contact spring module includes a support tube having a first end and a second end, the spring elements being wrapped around the first end and the second end of the support tube forming outer spring fingers interfacing with the socket terminal.

15. A power connector system comprising:

a busbar element extending between a first mating portion and a second mating portion, the first mating portion configured to be coupled to a socket terminal, the second mating portion configured to be coupled to an electrical component, the busbar element configured to transmit power between the socket terminal and the electrical component; and a pin terminal extending from the busbar element, the pin terminal extending between an inner end and an outer end, the outer end configured to be plugged into and mated with the socket terminal, the pin terminal having a mating interface at an exterior surface of the pin terminal configured to be mated with the socket terminal, the pin terminal having an inner bore, the pin terminal including a cooling channel in the inner bore of the pin terminal configured to receive cooling fluid flow therethrough, the cooling channel located interior of the mating interface to cool the pin terminal at the mating interface;

wherein the busbar element is tube-shaped forming a fluid supply tube supplying fluid to the cooling channel.

16. The power connector system of claim 15, wherein the cooling channel passes through the pin terminal from the inner end to the outer end.

17. The power connector system of claim 15, wherein the pin terminal extends between an inner end and an outer end, the inner bore being closed at the outer end, the cooling channel including an inlet port at the inner end and an outlet port at the inner end.

18. A power connector system comprising:

a busbar element extending between a first mating portion and a second mating portion, the first mating portion configured to be coupled to a pin terminal, the second mating portion configured to be coupled to an electrical component, the busbar element configured to transmit power between the pin terminal and the electrical component;

a socket terminal extending from the busbar element, the socket terminal having a socket opening configured to receive the pin terminal; and a fluid manifold coupled to at least one of the socket terminal and the first mating portion of the busbar element, the fluid manifold having an outer shell and an inner hub extending into a cavity of the outer shell, the socket terminal being located in the cavity of the outer shell, the inner hub including a hub interface configured to be coupled to the pin terminal, the inner hub including a cooling channel configured to be in fluid communication with an inner bore of the pin terminal to allow cooling fluid flow therethrough between the inner hub and the inner bore.

19. The power connector system of claim 18, further comprising an interface seal at the hub interface configured to seal to the pin terminal.

20. The power connector system of claim 18, wherein the outer shell includes a pocket configured to receive a mating end of the pin terminal, the inner hub extending into the pocket to interface with the mating end of the pin terminal.

21. The power connector system of claim 18, wherein the inner hub extends between a first end and a second end, the first end located in the cavity and defining the hub interface, the second end located exterior of the cavity for connecting to a fluid line.

22. A power connector system comprising:

a first busbar assembly having a first busbar element and a pin terminal extending from the first busbar element, the pin terminal having an inner bore, the pin terminal having a mating interface at an exterior surface of the pin terminal;

a second busbar assembly configured to be electrically coupled to the first busbar assembly to transmit power between the first busbar assembly and the second busbar assembly, the second busbar assembly having a second busbar element and a socket terminal extending from the second busbar element, the socket terminal having a socket opening receiving the pin terminal;

wherein the pin terminal includes a cooling channel in the inner bore of the pin terminal configured to receive cooling fluid flow therethrough, the cooling channel located in the socket terminal when the pin terminal is received in the socket opening of the socket terminal;

wherein the pin terminal extends between an inner end and an outer end, the inner bore being closed at the outer end, the cooling channel including an inlet port at the inner end and an outlet port at the inner end.

23. The power connector system of claim 22, wherein the pin terminal extends between an inner end and an outer end, the cooling channel passing through the pin terminal from the inner end to the outer end.

24. The power connector system of claim 22, wherein the first busbar element is tube-shaped forming a fluid supply tube supplying fluid to the cooling channel.

25. The power connector system of claim 22, wherein the second busbar assembly includes a fluid manifold coupled to at least one of the socket terminal and the second busbar element, the fluid manifold having an outer shell and an inner hub extending into a cavity of the outer shell, the socket terminal being located in the cavity of the outer shell, the inner hub including a hub interface configured to be coupled to the pin terminal, the inner hub including a cooling channel configured to be in fluid communication with the cooling channel of the pin terminal to allow cooling fluid flow therethrough between the inner hub and the inner bore.

26. The power connector system of claim 25, wherein the outer shell includes a pocket configured to receive a mating end of the pin terminal, the inner hub extending into the pocket to interface with the mating end of the pin terminal.

27. The power connector system of claim 25, wherein the inner hub extends between a first end and a second end, the first end located in the cavity and defining the hub interface, the second end located exterior of the cavity for connecting to a fluid line.

* * * * *